Patented June 26, 1945

2,379,142

UNITED STATES PATENT OFFICE 2,379,142

PROCESS OF PREPARING ANHYDROUS CALCIUM SULPHATE ABSORPTIVE MATERIAL

Richard S. Gaugler, Dayton, and Charles E. Waring, Oakwood, Ohio, assignors to General Motors Corporation, Dayton, Ohio, a corporation of Delaware No Drawing. Application January 10, 1941, Serial No. 374,021

2 Claims. (Cl. 252—194)

This invention relates to dehydrating agents for refrigerating systems and analogous apparatus, but more particularly to a process for preparing the dehydrating agents.

The presence of moisture in refrigerating systems and in many other systems causes corrosion. In order to prevent this corrosion, refrigerating systems are thoroughly dried before being charged with refrigerant. But even with this thorough drying, traces of moisture often remain in the system. In order to prevent such traces of moisture from causing corrosion, a drying material is placed in the system to absorb such traces of moisture.

One of the materials used for this purpose is dehydrated gypsum, commonly called "Drierite," which is substantially anhydrous calcium sulphate. This has been used in both stick and granular forms. The stick form, however, is expensive and does not have large exposed areas for moisture absorption. The granular form, as it has been used, is easily crushed and gives off a dust which is carried by the refrigerant throughout the refrigerating system. Also, this granular form tends to crumble when handled, creating an additional dust problem.

It is an object of our invention to provide a suitable drying material for refrigerating systems which will have a low cost and present a large surface area for moisture absorption which will also be free from dust.

It is another object of our invention to provide a suitable inexpensive process for making such a drying material.

It is still another object of our invention to provide an improved process for making such a drying material and for introducing such a drying material into a refrigerating system.

The drying material which we prefer to use is dust-free rounded particles of a dehydrated drying material such as dehydrated gypsum. These particles are preferably packed in a suitable container of metal or fabric prior to their dehydration. Generically, the process we use for making such materials comprises forming the drying material into rounded particles of suitable size limits, removing the dust from such particles and then dehydrating the particles so as to enable the particles to absorb moisture.

Specifically, the material we employ is dehydrated gypsum in the form of rounded particles smaller than a No. 8 mesh size. These particles are preferably packed into a fabric bag or other suitable container prior to their dehydration and are preferably inserted into the refrigerating system prior to dehydration. However, when this cannot conveniently be done, the particles may be dehydrated prior to their insertion into the refrigerating system.

This material is preferably made in the following manner:

First, raw gypsum rock of high purity is crushed in a conventional type of rock crusher to a degree of fineness wherein the particles will pass through a No. 8 mesh screen. This finely crushed rock then is sized by screening so that substantially all the particles accepted are of No. 8 mesh size, with the remainder of the crushed material being rejected. After this, the sized particles are placed in a rotating crock or mill together with a quantity of water and the particles of gypsum are tumbled over and over again, over one another until all of the sharp corners and edges are worn off. When examined under a microscope the particles of gypsum after this treatment resemble small pebbles because they are generally round and smooth and do not present any sharp projections. The granular gypsum is then thoroughly flushed with clean water to wash off all of the dust or fine particles formed by the tumbling operation. The pebbles of gypsum which remain are allowed to dry in the air and are then ready to be dehydrated or converted to "Drierite."

At this stage it is desirable that as much as possible of the handling operations applicable to the drying material be completed. For example, it is desirable at this time to place the rounded and washed pebbles of gypsum into the fabric or metal containers which hold the pebbles when in use. If the containers are to be used in a refrigerating system and suitable equipment is available, the containers may be placed in their proper place in a refrigerating system and the entire refrigerating system may then be subjected to the dehydrating operation which will not only dehydrate the refrigerating system but which will also dehydrate the gypsum and convert the gypsum into substantially an anhydrous calcium sulphate. This is preferably accomplished by the use of heat and vacuum. Preferably the temperature used for this purpose is between 250° and 300° F., while the absolute pressure maintained under this vacuum should be less than four millimeters of mercury.

If it is not convenient to dehydrate the pebbles of gypsum in the refrigerating system, this process may be carried out by placing the containers containing the pebbles of gypsum in a suitable oven where the gypsum is dehydrated at a temperature of from between 250° and 300° F., and under a vacuum maintained at an absolute pressure of less than four millimeters of mercury. Preferably, this drying is continued until substantially all the moisture is removed from the gypsum and it is converted to substantially an anhydrous calcium sulphate. To assure the best results, this dehydration should be carried on under these conditions for twenty-four hours. However, somewhat satisfactory results may be obtained if this time is reduced. By this procedure, less than three-tenths of one percent of moisture will remain in the calcium sulphate.

It is of course, not necessary to dehydrate the pebbles of gypsum in a container, although in most cases it is desirable. While this material is applicable for use in refrigerating systems, it is obvious that it may be used in other systems and other type applications. While we have illustrated our process with respect to gypsum and dehydrated gypsum it is obvious that it is applicable to other drying materials of the same general character, such as activated silica or activated charcoal.

While the form of embodiment of the invention as herein disclosed, constitutes a preferred form, it is to be understood that other forms might be adopted, all coming within the scope of the claims which follow.

What is claimed is as follows:

1. The process of preparing an absorptive material from raw gypsum and drying and evacuating a refrigerating system which comprises crushing the raw gypsum to form particles of a desired maximum size, selecting the gypsum particles of the desired size from the crushed material, rounding off the corners and sharp edges from the selected gypsum particles, washing the selective particles to remove the dust therefrom, placing the particles in a container, placing the container in a refrigerating system, and then evacuating and dehydrating the interior of the refrigerating system, the container and the particles at the same time in a single operation.

2. The process of preparing an anhydrous calcium sulphate absorptive material and drying and evacuating a refrigerating system which comprises placing the absorptive material in a refrigerating system, and then evacuating and dehydrating the interior of the refrigerating system and the absorptive material at a temperature between 250° and 300° F. and a pressure less than four millimeters of mercury.

RICHARD S. GAUGLER.
CHARLES E. WARING.